United States Patent
Faughn

(10) Patent No.: US 9,463,770 B2
(45) Date of Patent: Oct. 11, 2016

(54) PERSONNEL RESTRAINT SEAT BELT

(71) Applicant: Jim Allen Faughn, Baltimore, MD (US)

(72) Inventor: Jim Allen Faughn, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 19 days.

(21) Appl. No.: 13/916,725

(22) Filed: Jun. 13, 2013

(65) Prior Publication Data

US 2013/0334802 A1    Dec. 19, 2013

Related U.S. Application Data

(60) Provisional application No. 61/659,214, filed on Jun. 13, 2012.

(51) Int. Cl.
*B60R 22/12* (2006.01)
*F21V 25/00* (2006.01)
*F21V 33/00* (2006.01)

(52) U.S. Cl.
CPC .............. *B60R 22/12* (2013.01); *F21V 25/00* (2013.01); *F21V 33/0064* (2013.01)

(58) Field of Classification Search
CPC .................................................. B60R 22/12
USPC .............. 280/801.1; 297/483, 484, 485, 468
See application file for complete search history.

(56) References Cited

U.S. PATENT DOCUMENTS

| 3,306,662 | A | * | 2/1967 | Finnigan | 297/482 |
|---|---|---|---|---|---|
| 5,472,235 | A | * | 12/1995 | Dubay | 280/808 |
| 5,954,365 | A | * | 9/1999 | Wier et al. | 280/801.1 |
| 7,350,809 | B2 | * | 4/2008 | Matsuda | 280/735 |
| 7,557,720 | B2 | * | 7/2009 | Rubin | A62B 3/005 340/321 |
| 8,240,767 | B2 | * | 8/2012 | Greenwood | 297/344.18 |
| 8,740,305 | B2 | * | 6/2014 | Greenwood | 297/344.18 |
| 8,757,721 | B2 | * | 6/2014 | Greenwood | 297/344.18 |
| 2002/0130506 | A1 | * | 9/2002 | Knych et al. | 280/801.1 |
| 2003/0057762 | A1 | * | 3/2003 | Kim | 297/468 |
| 2005/0214088 | A1 | * | 9/2005 | Acton | 410/3 |
| 2007/0069514 | A1 | * | 3/2007 | Regoli et al. | 280/801.1 |
| 2007/0182534 | A1 | * | 8/2007 | Gregory | 340/457.1 |
| 2007/0195990 | A1 | | 8/2007 | Levy | |
| 2009/0058061 | A1 | * | 3/2009 | Fuisz et al. | 280/801.1 |
| 2009/0096200 | A1 | * | 4/2009 | Jamison | 280/804 |
| 2009/0295138 | A1 | * | 12/2009 | Cox et al. | 280/801.1 |
| 2010/0025976 | A1 | * | 2/2010 | Murtha et al. | 280/801.1 |
| 2012/0019043 | A1 | * | 1/2012 | Merrill et al. | 297/484 |
| 2012/0256469 | A1 | * | 10/2012 | Greenwood | 297/483 |
| 2013/0307312 | A1 | * | 11/2013 | Greenwood et al. | 297/468 |
| 2013/0307313 | A1 | * | 11/2013 | Greenwood et al. | 297/468 |
| 2014/0035338 | A1 | * | 2/2014 | Greenwood et al. | 297/344.12 |

FOREIGN PATENT DOCUMENTS

| AU | 262321 | * | 7/1962 | |
| CA | 2218490 | A1 * | 6/1999 | |
| DE | 202007006011 | U1 * | 8/2007 | ......... A44B 11/2565 |
| EP | 1306275 | A1 * | 5/2003 | ............ B60R 22/12 |
| FR | 2808754 | A1 * | 11/2001 | ............ B60R 22/12 |
| GB | 2186612 | A * | 8/1987 | ............ B60R 22/12 |
| WO | WO 03037689 | A1 * | 5/2003 | |

* cited by examiner

*Primary Examiner* — Nicole Verley
(74) *Attorney, Agent, or Firm* — Christos S. Kyriakou

(57) ABSTRACT

A personnel restraint seat belt having an elongated flexible web with a front surface, a rear surface, and two side edges. A distinguishing feature, such as a raised bump, color strip, or edge cut outs are provided adjacent at least one of the side edges of the web. The distinguishing feature allows for rapid identification of the restraint seat belt during emergency situations.

23 Claims, 5 Drawing Sheets

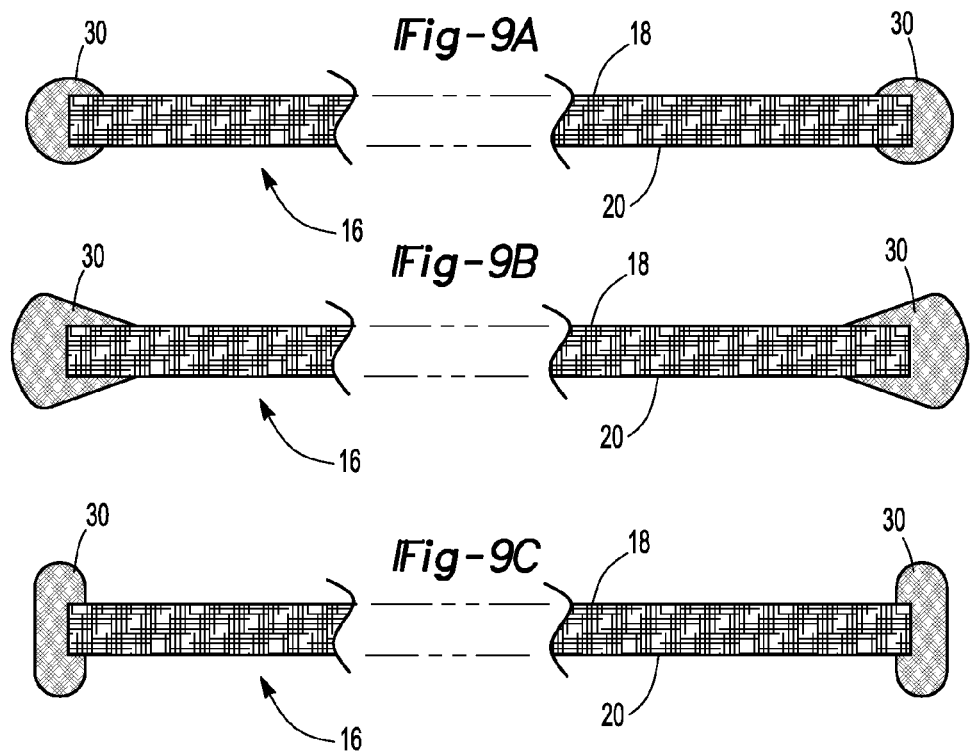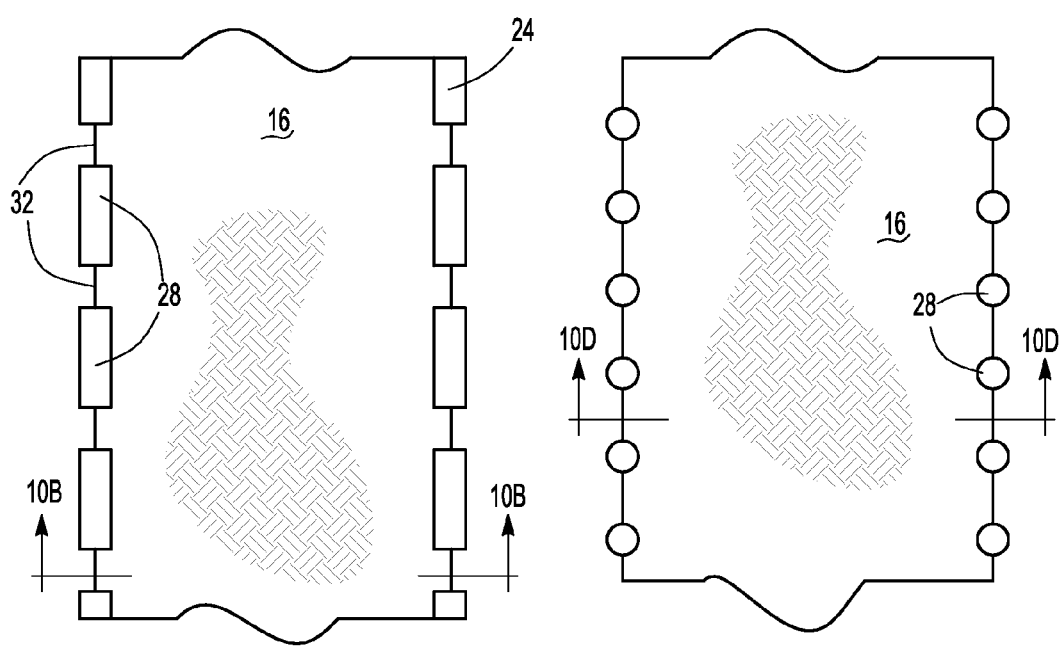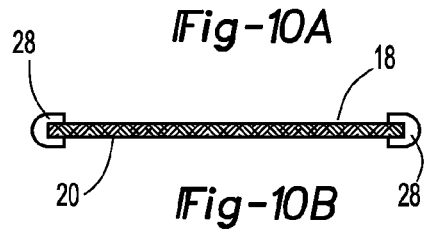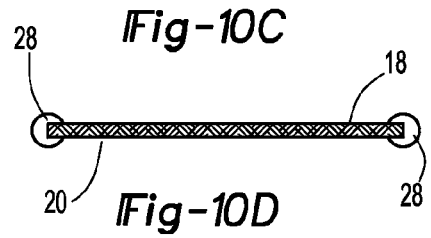

PERSONNEL RESTRAINT SEAT BELT

CROSS-REFERENCE TO RELATED APPLICATIONS

This patent application claims the benefit of U.S. Provisional Patent Application No. 61/659,214 titled "Lighted Egress Apparatus" (ARL 09-38P) filed on Jun. 13, 2012; the entire contents which are hereby incorporated by reference herein including all attachments and other documents that were incorporated by reference in U.S. Provisional Patent Application No. 61/659,214. This patent application is related to U.S. Non-Provisional patent application No. 13/916,745 (ARL 09-38) also titled "Lighted Egress Apparatus" and filed on Jun. 13, 2013 the contents of which are hereby incorporated by reference herein.

GOVERNMENT INTEREST

The invention described herein may be manufactured, used, and licensed by or for the United States Government.

BACKGROUND OF THE INVENTION

I. Field of the Invention

The present invention relates generally to personnel restraint seat belts and, more particularly, to such a seat belt which enables rapid identification of the belt during emergency situations.

II. Description of Relevant Art

Essentially all military and non-military vehicles include personnel safety restraint seat belts for securing the personnel to the vehicle during the operation of the vehicle. During normal operation of the vehicle, the release of the seat belts can be easily accomplished by the military personnel.

Military and non-military vehicles, as well as the personnel within those vehicles, however, are oftentimes subjected to emergency situations. For example, an improvised explosive device (IED), bomb blast, rollover, explosion, accident, gas leak and so forth may not only damage or even render inoperable the vehicle, but may also temporarily incapacitate the occupants of the vehicle. When such an event occurs the occupants are subjected to violent physical effects which can severely alter their cognitive reasoning capabilities, this coupled with chaotic life threatening situations, stress and confusion makes it even more difficult for soldiers to perform emergency egress and survival procedures. This invention helps to reduce this problem by making the restraint belts easier to locate, see, identify, and grasp for expedient cutting and hence the saving of lives under these intense and chaotic emergency egress conditions.

Furthermore, during such an event, the vehicle safety belts may become locked and intermingled or entwined with other straps either present within the vehicle or used to secure or otherwise carry gear and other equipment in the vehicle. When this happens it may be difficult to identify the seat belt. In addition to the restraint belts being intermingled or entwined with other straps, there is also a danger that the shoulder belts will be caught in a "Gear Valley" on the soldier. Soldiers wear great amounts of gear and equipment known as Body Borne Equipment (BBE) on their chests (ammo pouches, Improved First Aid Kit (IFAK), flashlights, radios, grenade pouches, etc.). Such BBE can entrap, hide, and obscure the shoulder belts, for example, if a safety belt becomes wedged in between two ammo pouches the safety belt will be difficult to see or locate. The gap between two pieces of equipment, such as two ammo pouches, is referred to as a "Gear Valley". In addition to other belts and straps intermingling with the restraint belts present in the vehicle, the restraint belts may become difficult to see, locate, and identify even on the soldier's chest because of the "Gear Valley" effect and comingling with the multitude of chest mounted gear. In addition to the problem of the Gear Valley, soldiers also at times will wear gas masks. When wearing a gas mask a soldier's close-in vision is degraded, especially around his own chest and body—so the addition of tactile and visual indicators to the belts is a huge advantage for them—especially when helping others who may not be able to see their own belts.

In these situations it is oftentimes necessary for the vehicle personnel to release themselves from the vehicle seat belts and escape from the vehicle. For example, if the vehicle is in water or on fire, serious injury or death can result unless the vehicle occupants quickly escape from the vehicle.

However, in such emergency situations, a rapid escape from the vehicle by unlatching the seat belt may not be practical or possible if the release buckle is jammed or inoperable. For example, if the vehicle occupant is blinded by smoke, debris, eye damage, total darkness or the like, he or she may not be able to quickly identify the restraint seat belt to cut the seat belt apart with a knife. This is particularly true where the restraint seat belt is intertwined with other belts present within the vehicle or in a Gear Valley which results in excessive search and fumble time in order to find the proper seat belt to cut and free the personnel from the vehicle.

The proper identification of the seat belt by the vehicle occupants during an emergency situation is particularly serious for vehicle occupants that have been injured or rendered unconscious so that it is impossible for the occupants to extricate themselves from the vehicle. In these situations, rescuers must be able to rapidly enter the vehicle and identify and cut the personnel restraint seat belts in order to free the occupants. As such, these rescuers face the same difficulties in the proper identification of the restraint seat belt during the rescue operation.

SUMMARY OF THE PRESENT INVENTION

The present invention provides a personnel restraint seat belt which overcomes many of the above mentioned disadvantages of the previously known seat belts.

In brief, the restraint seat belt of the present invention comprises an elongated flexible web having a front surface, a rear surface, and two spaced apart side edges. The seat belt itself is typically constructed from a woven fabric although other materials may be used without deviation from the spirit or scope of the invention.

A distinguishing feature is provided adjacent at least one and preferably both of the side edges of the web. This distinguishing feature provides a rapid identification of the personnel restraint seat belt since the distinguishing feature is used only on personnel restraint seat belts and no other types of belt, gear, or equipment.

One or more different types of distinguishing features may be utilized in accordance with the present invention. For example, the distinguishing feature can comprise a plurality of bumps which protrude outwardly from either the front or rear surface, or both, adjacent one or both side edges of the web. Since these bumps protrude outwardly from the web, the bumps provide a tactile feedback so that the seat belt can be immediately identified and cut to free the personnel from the vehicle. This tactile feature will also work with soldiers/occupants who are wearing gloves, as typically soldiers wear combat protective gloves. These tactile distinguishing features can also be either illuminated, luminous, or reflective and/or be a combination of any of these features.

Alternatively, the distinguishing feature comprises a side edge having a cross-sectional shape and area which differs from the cross-sectional shape and area of the central portion of the seat belt web. Thus, the side edges of the seat belt web provide a tactile feedback which facilitates rapid identification of the seat belt so that it may be cut and free the vehicle occupant.

In a still further modification, the distinguishing feature includes one or more color strips adjacent the side edges of the web. These color strips may be either illuminated, i.e. powered, or simply highly reflective or luminescent. In any event, the seat belt web may be easily and rapidly identified by the light reflected from the seat belt web or, alternatively, light emitted from the seat belt web. The illumination feature can be automatically activated by sensors which activate the system when an accident, rollover, or crash occurs.

In a still further modification, the side edges of the seat belt web include a plurality of cut outs. These cut outs again provide tactile feedback to the vehicle occupants, or a rescuer, to facilitate the rapid identification of the seat belt web. This rapid identification of the seat belt web enables the seat belt web to be quickly cut and the vehicle personnel quickly freed.

In a still further modification of the invention, the front side of the web has a color that differs from the rear side of the web. For example, the front side of the web, i.e. the forwardly exposed side, may be a dull green or brown color for its camouflage effect, while the rear side of the seat belt web is a brightly colored non-camouflage color, such as orange. Consequently, in the event that the seat belt is attached improperly or twisted, at least a portion of the rear side of the seat belt will become visible and provide a clear and instantly recognizable indication that the seat belt is improperly connected. Restraint belt effectiveness can be severely diminished if the belt has even one twist in it, the fibers and webbing strands are designed to resist linear forces and when the belt is positioned in a non-linear configuration (i.e. twist) the ability of the strands to react to forces it is not designed for can severely degrade its effectiveness. The improper connection of the seat belt, of course, may otherwise result in injury to the personnel.

BRIEF DESCRIPTION OF THE DRAWING

A better understanding of the present invention will be had upon reference to the following detailed description when read in conjunction with the accompany drawing, wherein like reference characters refer to like parts throughout the several views, and in which:

FIGS. 9A-9C are all views similar to FIG. 8, but illustrating modifications thereof;

FIG. 10A is a view similar to FIG. 7, but illustrating a modification thereof;

FIG. 10B is a view taken along line 10B in FIG. 10A;

FIG. 10C is a view similar to FIG. 10A, but illustrating a modification thereof;

FIG. 10D is a view taken along line 10D-10D in FIG. 10C;

DETAILED DESCRIPTION OF PREFERRED EMBODIMENTS OF THE PRESENT INVENTION

Figure 1:
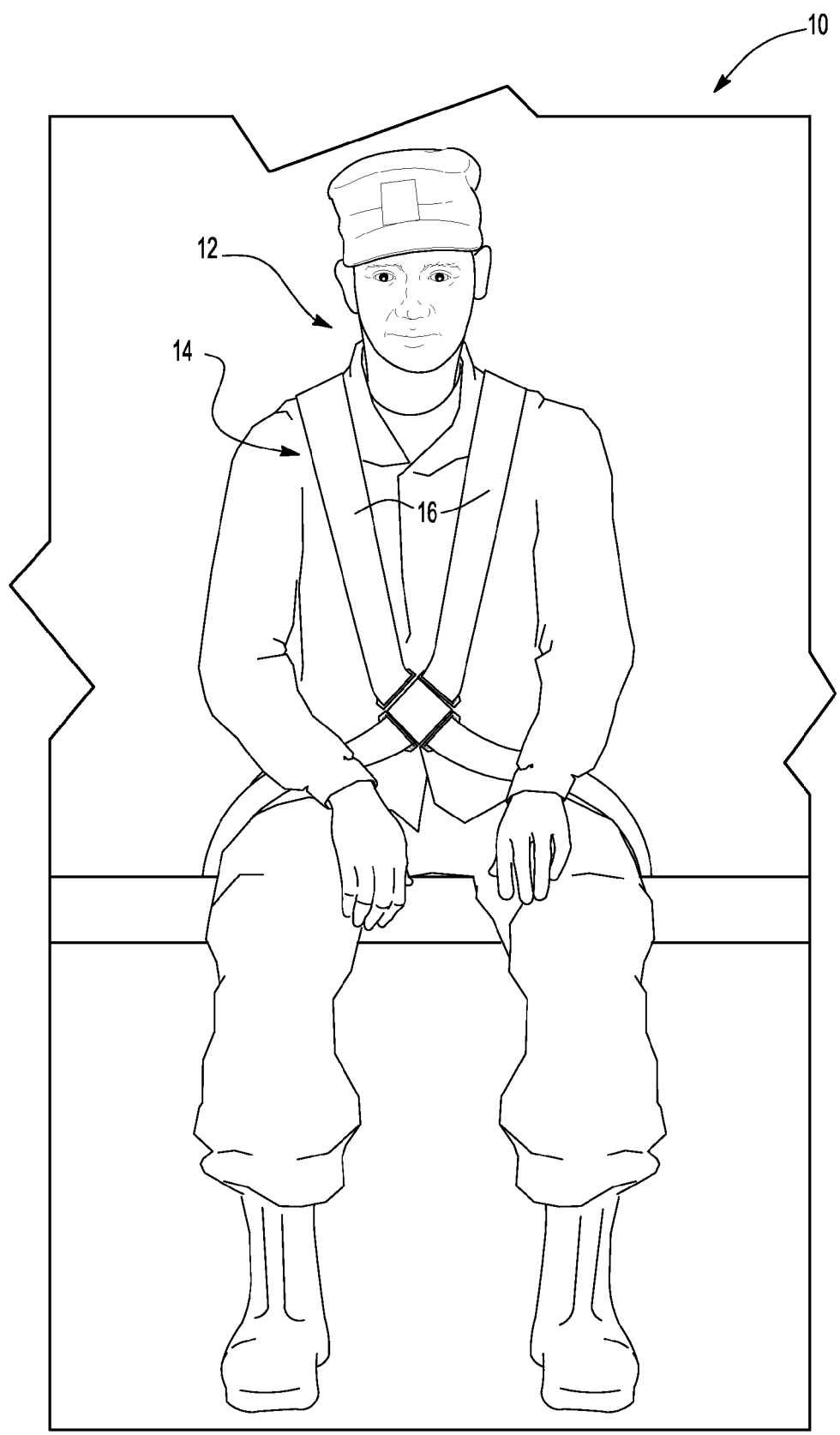
FIG. 1 is an elevational view illustrating a soldier strapped into a vehicle by a seat belt.

With reference first to FIG. 1, a military vehicle 10 is illustrated diagrammatically with personnel, e.g. a soldier 12, seated within the vehicle 10. The soldier 12 is held to the vehicle by a personnel restraint seat belt 14. In the conventional fashion, the seat belt 14 includes elongated webs 16 which extend around the soldier 12 and are releasably locked to the vehicle 10 by release buckle 17.

Figure 2:
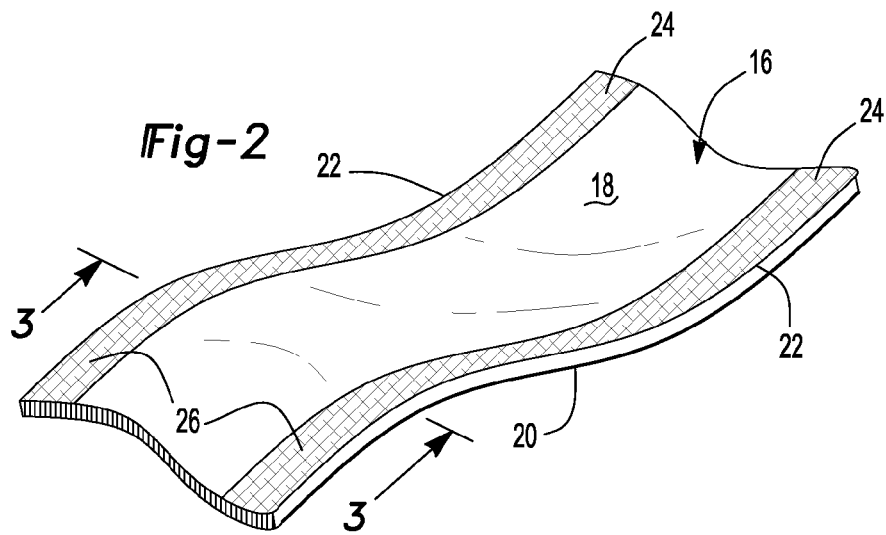
FIG. 2 is a plan view of a section of a seat belt web.
Figure 3:
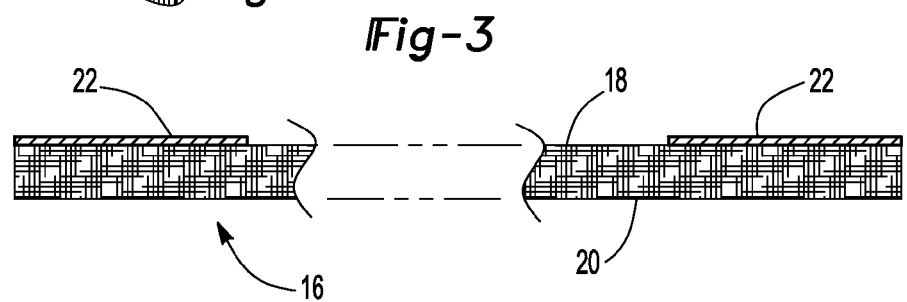
FIG. 3 is a view taken along line 3-3 in FIG. 2.

With reference now to FIGS. 2 and 3, a portion of the seat belt web 16 is shown and includes a front surface 18 which faces forwardly of the soldier 12, a rear side 20 which faces the soldier 12, and two side edges 22. The web itself is flat and flexible and may be constructed of any suitable material, such as woven fabric, a synthetic material, or the like.

Still referring to FIGS. 2 and 3, in order to differentiate the web 16 for the restraint seat belts from other types of belts that may be present within the vehicle 10, a distinguishing feature 24 which is used only in connection with personnel restraint seat belts is provided adjacent at least one, and preferably both, of the web side edges 22.

For example, as shown in FIG. 2, the distinguishing feature 24 includes a reflective or luminous strip 26. The reflective or luminous strip may be either continuous along the side edges 22 of the web 16 or may be present in spaced apart strips. In any event, the reflective or luminous strips 26 enable the seat belt web 16 to be rapidly differentiated from other belts that may be present within the vehicle 10 so that the web 16 may be released or cut and the soldier 12 rapidly freed from the vehicle 10. If the vehicle is upside down and the war fighter is then hanging upside down as well, it may be beneficial for the soldier to cut individual belts as opposed to releasing them all at once with the release buckle 17. This may reduce or eliminate further body damage to oneself or a soldier located beneath the suspended soldier by allowing a safer and more controlled descent rather than dropping instantaneously after releasing all the belts simultaneously. This controlled extrication capability may be very beneficial for rescue crews especially for incapacitated soldiers who may be injured; a controlled extrication may prevent further bodily injury rather than dropping the injured soldier all at once.

Alternatively, the strips 26 may be replaced by an electrically powered device, such as a fiber optic illuminated at one end or an electroluminescent (EL) panel, or any other electrically powered device. Flexible thin film conductors will permit circuitry to be embedded into or onto the restraint belts to power any such illumination device as needed. In these situations, the use of the powered electric device completely eliminates the need to use external light to identify the seat belt web 16.

Figure 4:
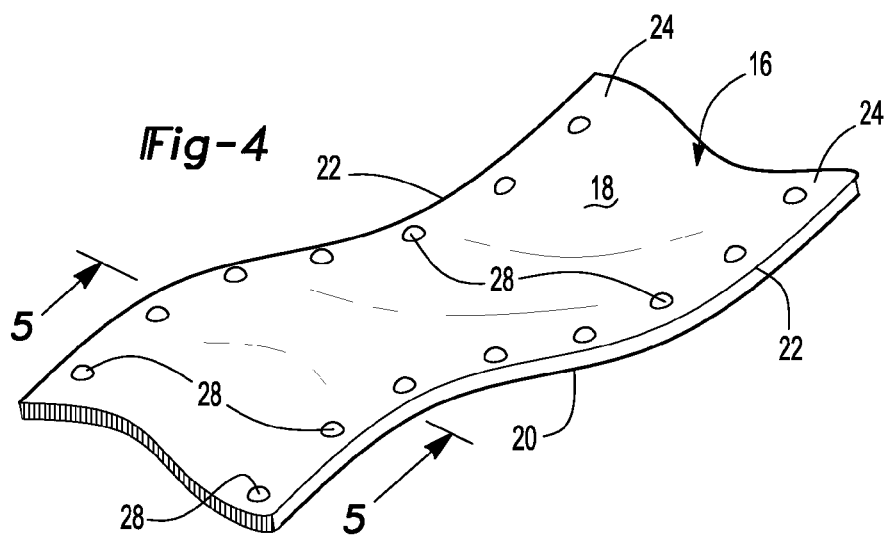
FIG. 4 is a view similar to FIG. 2, but illustrating a modification thereof.
Figure 5:
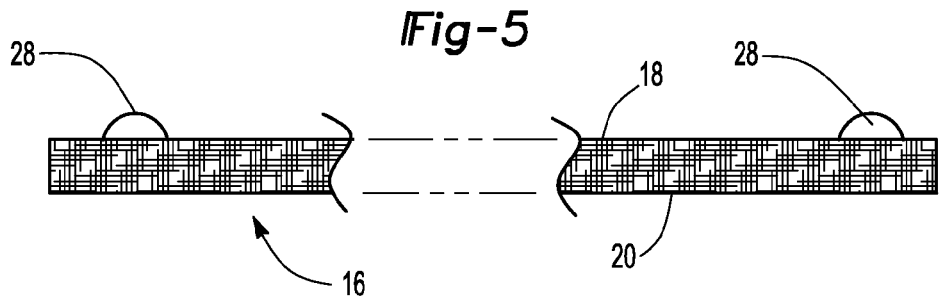
FIG. 5 is a view taken along lines 5-5 in FIG. 4.
Figure 6A:
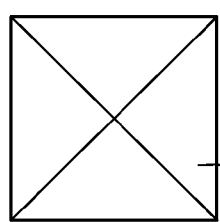
FIGS. 6A and 6C are top and side views illustrating one design for the protruding nodes.
Figure 6B:
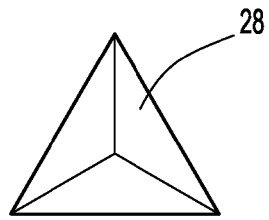
FIGS. 6B and 6D are top and side views, respectively, illustrating another design for the protruding nodes.
Figure 6C:
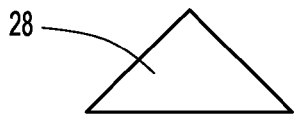
Figure 6D:
Figure 6E:
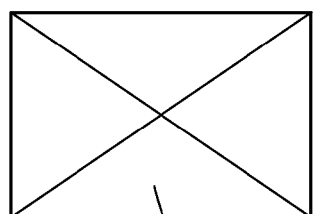
FIGS. 6E and 6F are top and side views, respectively, of yet another design for the protruding nodes.
Figure 6F:
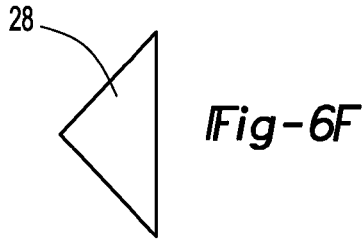

With reference now to FIGS. 4 and 5, a modification to the present invention is shown in which the distinguishing feature 24 comprises a plurality of spaced bumps 28 adjacent to one or both of the side edges 22 of the web 16. As best shown in FIG. 5, these bumps 28 protrude outwardly from either the front surface 18 of the web 16, rear surface 20 of the web 16, or both.

With reference now to FIGS. 5 and 6A-6F, the bumps 28 may take any of several different forms. For example, in FIG. 5 the bumps 28 are shown as being semispherical in shape. Alternatively, as shown in FIGS. 6A-6F, the bumps may be polyhedral in shape. Regardless of the shape of the bumps 28, the bumps 28 protrude outwardly from one or both surfaces of the web 16. In one embodiment the bumps are formed from tritium dots or another luminous material or paint that can be used to provide markings that are visible under specific lighting. If the tritium dots or luminescent dots are applied to a belt in sufficient thickness the dots will also provide tactile feedback. Thus, tritium dots or other luminescent material can be used to provide visual indicators or indicator that are both visual and tactile. In yet another embodiment, bumps 28, edge configuration 30 or other distinguishing feature 26 comprise a material that is visible under a specific wavelength of light. The wavelength can be provided on a cutting tool. Thus, the bumps 28, edge configuration 30 or other distinguishing feature 26 will only be visible when illuminated with the tool to provide a belt with indicators that are less visible, for example during stealthy operations.

In operation, the bumps 28 provide a tactile feedback which enables the user or a rescuer to rapidly identify the seat belt web so that it may be cut and the vehicle occupant freed from the vehicle. Additionally, the bumps 28 are preferably aligned on the web 16 so that they do not register with each other when the web 16 is coiled in order to minimize the thickness of the coil.

Figure 7:
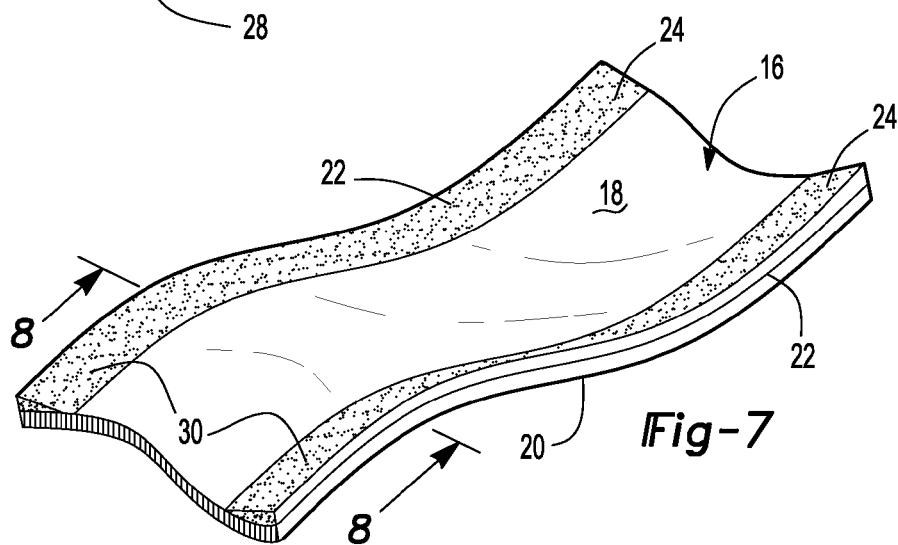
FIG. 7 is a view similar to FIG. 2, but illustrating a modification thereof.
Figure 8:
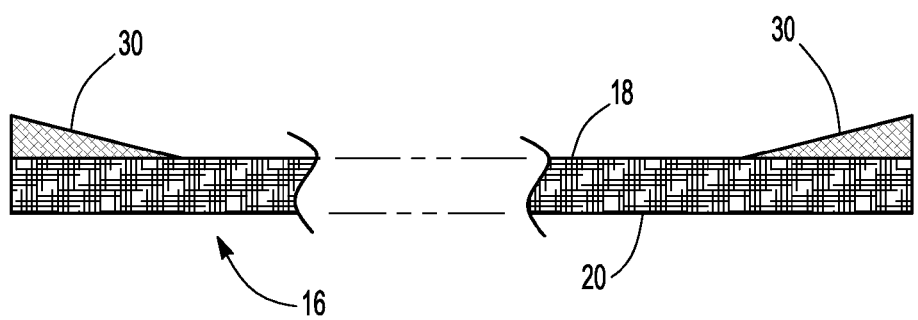
FIG. 8 is a view taken along line 8-8 in FIG. 7.

With reference now to FIGS. 7 and 8, alternatively the distinguishing feature 24 comprises an edge configuration 30 having a cross-sectional area different than the cross-sectional area of a central portion of the web 16. For example, as shown in FIG. 8, one such edge configuration would be a generally triangular strip which extends either continuously or at spaced intervals adjacent the side edges 22 of the web 16. As shown in FIG. 8, the cross-sectional area of the edge configurations 30 generally have a larger cross-sectional area than the central portion of the web 16 for the same lateral width as the edge configuration.

Although the edge configuration 30 illustrated in FIG. 8 is shown as protruding outwardly from only the front surface 18 of the web 16, it may protrude outwardly from both the front surface 18 and rear surface 20 of the web 16 as shown in FIG. 9B. Similarly, other shapes, such as a spherical shape as shown in FIG. 9A, or a rectangular or dumbbell shape, as shown in FIG. 9C, may alternatively be used.

Regardless of the actual shape of the edge configuration, the edge configuration 30 provides tactile feedback to an occupant of a vehicle during an emergency situation and/or to a rescuer so that the seat belt web 16 may be easily and rapidly identified. Once identified, the seat belt web 16 may be released or cut and the vehicle occupant freed.

Figures 10E, 10G:
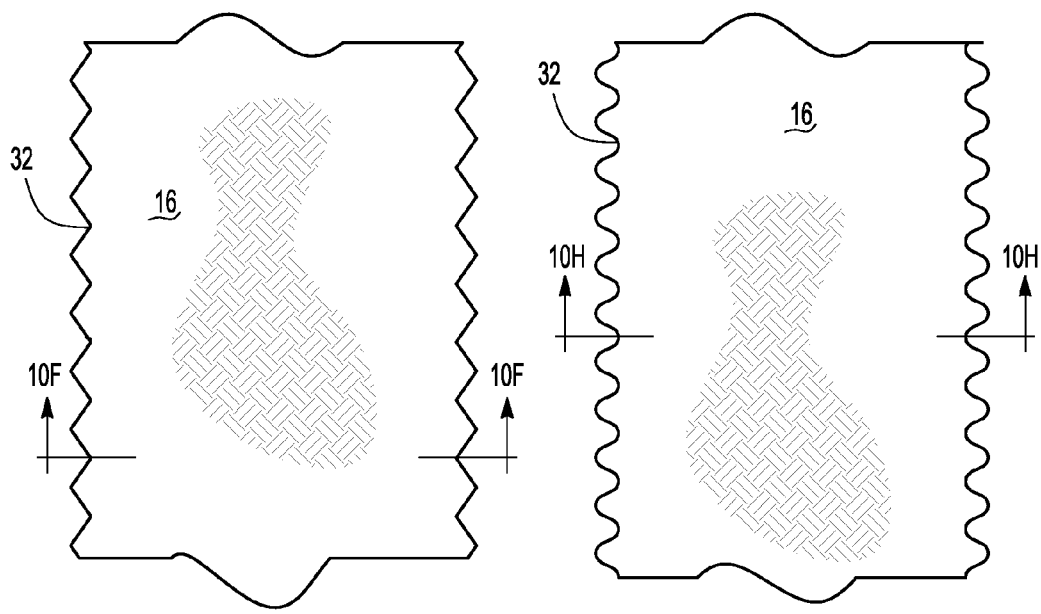
FIG. 10E is a view similar to FIG. 10A, but illustrating a modification thereof.
FIG. 10G is a view similar to FIG. 10E, but illustrating a modification thereof.
Figures 10F, 10H:
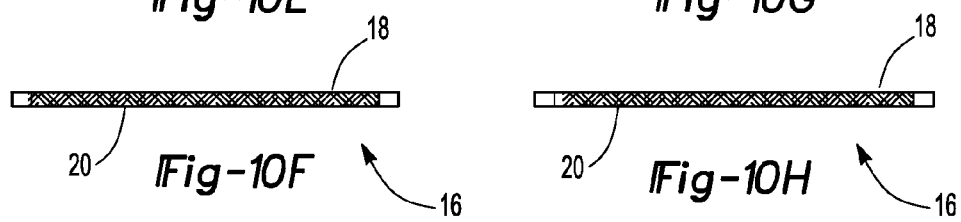
FIG. 10F is a view taken along line 10E-10F in FIG. 10E.
FIG. 10H is a view taken along line 10H-10H in FIG. 10G.

With reference now to FIGS. 10A and 10B, the distinguishing feature 24 may alternatively comprise a plurality of spaced cut outs or attached protuberances 32 along one or both sides of the seat belt web 16. These cut outs 32, either alone or in combination with three-dimensional bumps 28 along one or both side edges 22 of the web 16, may be used to provide a tactile feedback of the web 16. These bumps 28 may be of any convenient shape, such as rectangular bumps 28 as shown in FIGS. 10A and 10B, or spherical bumps 28 as shown in FIGS. 10C and 10D.

It is not necessary that the cut outs 32 be combined with three-dimensional bumps as shown in FIGS. 10A-10D. Rather, the cut outs 32 may be flush with the front and rear surfaces 18 and 20 of the seat belt web 16 as shown in FIGS. 10E-10H. Furthermore, the shape of the cut outs 32 may be any convenient shape, such as triangular as shown in FIG. 10E or loop shaped as shown in FIG. 10G.

As shown in FIG. 10A, the belt web 16 may also include one or more ultraviolet, infrared or otherwise non-visible targets 36 which reflect when illuminated by ultraviolet, infrared or otherwise non-visible illumination.

Figure 11:
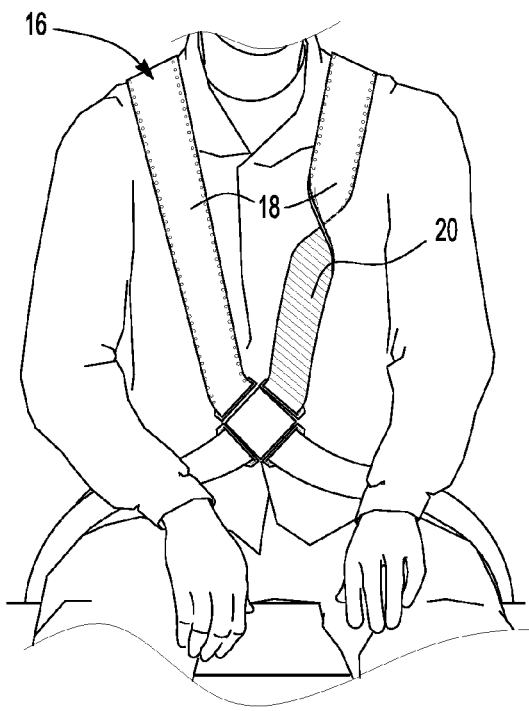
FIG. 11 is an elevational view illustrating yet a further modification of the present invention.

With reference now to FIG. 11, a still further improvement of the present invention is shown in which the front side 18 of the web 16 has one color or color scheme. For example, dull greens and dull browns may be used on the front side of the web 16 in order to provide for additional camouflage for the soldier.

However, the opposite side 20 of the web 16 is colored a completely different and contrasting color, such as bright orange. Consequently, in the event that the seat belt is twisted as shown in FIG. 11, the twist in the seat belt will expose the contrasting color on the rear side 20 of the seat belt web 16 so that it may be easily detected and corrected by the soldier.

From the foregoing, it can be seen that the present invention provides significant improvements in seat belt technology which are particularly suitable for military uses. However, no undue limitations should be drawn therefrom and, instead, the present invention may be used on non-military, as well as military applications.

Having described the invention, it can be seen that the present invention provides several important advances in seat belt technology. Having described the invention, however, many modifications thereto will become apparent to those skilled in the art to which it pertains without deviation from the spirit of the invention as defined by the scope of the appended claims.

I claim:

1. A personnel restraint seat belt that includes a distinguishing feature that enables rapid identification of the personnel restraint seat belt during an emergency situation by a passenger wearing gloves from other belts, straps, gear or other equipment worn by a person that makes the belt easier to identify from other straps, gear or other equipment, the personnel restraint seat belt comprising:
   an elongated flexible web having a front surface, a rear surface and two side edges; and
   a distinguishing feature that comprises a plurality of bumps which protrude outwardly from either the front surface or the rear surface provided on at least one of said sides of said web and adjacent at least one of said two side edges of said surface which provides rapid identification of said web and said side edge from other edges of other straps, gear or other equipment;

wherein said plurality of bumps include an illumination feature that becomes automatically activated by sensors which activate when an accident, rollover or crash occurs.

2. The seat belt as defined in claim 1 wherein said plurality of bumps protrude outwardly from the front surface of said web.

3. The seat belt as defined in claim 2 wherein said bumps are semispherical in shape.

4. The seat belt as defined in claim 2 wherein said bumps are polyhedral in shape.

5. The seat belt as defined in claim 2 wherein said bumps are provided adjacent both edges of said web.

6. The seat belt as defined in claim 2 wherein said bumps are arranged in a pattern on said web so that, upon winding said web into a coil, said bumps do not align with each other.

7. The seat belt as defined in claim 1 wherein said distinguishing feature comprises an edge configuration which extends along at least a portion of at least one side edge of said web, said edge configuration having a different cross-sectional shape than a cross-sectional shape of a central portion of said web.

8. The seat belt as defined in claim 7 wherein said edge configuration extends continuously along said at least one edge of said web.

9. The seat belt as defined in claim 7 wherein said edge configuration extends along at least a portion of both side edges.

10. The seat belt as defined in claim 7 wherein said edge configuration has a greater cross-sectional area than the cross-sectional area of a central portion of said web of the same lateral dimension.

11. The seat belt as defined in claim 1 wherein said distinguishing feature comprises a light emitting device.

12. The seat belt as defined in claim 1 wherein said distinguishing feature comprises a light reflective material.

13. The seat belt as defined in claim 1 wherein said distinguishing feature comprises a luminous material.

14. The seat belt as defined in claim 1 wherein said distinguishing feature comprises a plurality of spaced cut outs along at least a portion of at least one of said side edges of said web.

15. The seat belt as defined in claim 14 wherein said distinguishing feature comprises a plurality of spaced cut outs along at least a portion of both of said side edges of said web.

16. The seat belt as defined in claim 1 wherein said front surface of said web is colored differently than said rear surface of said web.

17. The seat belt as defined in claim 1 wherein distinguishing feature comprises a non-visible target which visibly reflects when illuminated by non-visible radiation.

18. The seat belt as defined in claim 1 wherein the plurality of bumps comprise tritium or another luminous material.

19. The seat belt as defined in claim 1 wherein the plurality of bumps comprise a material that is visible under a specific wavelength of light.

20. The seat belt as defined in claim 1 wherein said distinguishing feature comprises an edge configuration which extends along at least a portion of at least one side edge of said web, said edge configuration having a different cross-sectional shape than a cross-sectional shape of a central portion of said web
and the edge configuration which extends along at least a portion of at least one side edge of said web comprises tritium or another luminous material.

21. A personnel restraint seat belt that includes a distinguishing feature that enables rapid identification, during an emergency situation by a person wearing protective gloves, of the personnel restraint seat belt from other straps, belts, gear or other equipment worn by a person that makes the belt easier to identify from other straps, belts, gear or other equipment, the personnel restraint seat belt comprising:
an elongated flexible web having a front surface, a rear surface and two side edges;
a distinguishing feature that comprises a plurality of bumps which protrude outwardly from either the front surface or the rear surface provided on at least one of said sides of said web and adjacent at least one of said two side edges of said surface which provides rapid identification by a person wearing protective gloves of said web and said side edge from other edges of other straps, belts, gear or other equipment;
wherein said plurality of bumps comprise a material that is only visible when illuminated by a specific wavelength of light that is provided on a cutting tool.

22. A personnel restraint seat belt of claim 21 wherein said plurality of bumps reflect and is only visible when illuminated with a tool that includes an ultraviolet or infrared light source or other light source invisible to an unaided human eye.

23. The seat belt as defined in claim 22 wherein said plurality of bumps protrude outwardly from the front surface of said web.

* * * * *